J. E. Gedney,
Scaffold.
No. 77,273. Patented Apr. 28, 1868.
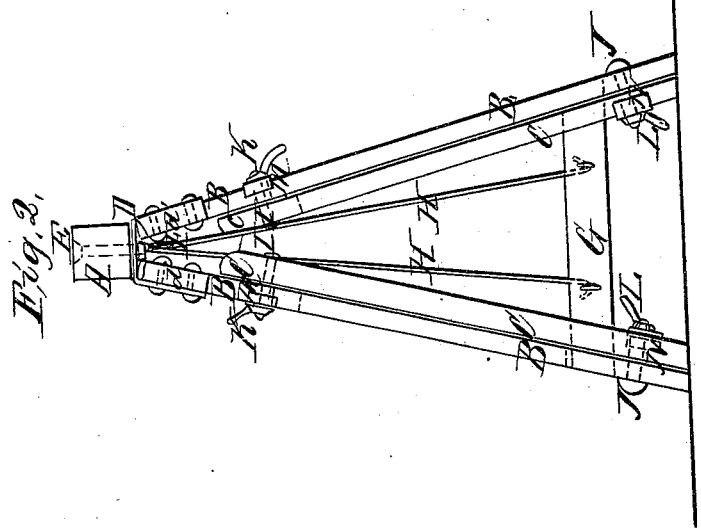
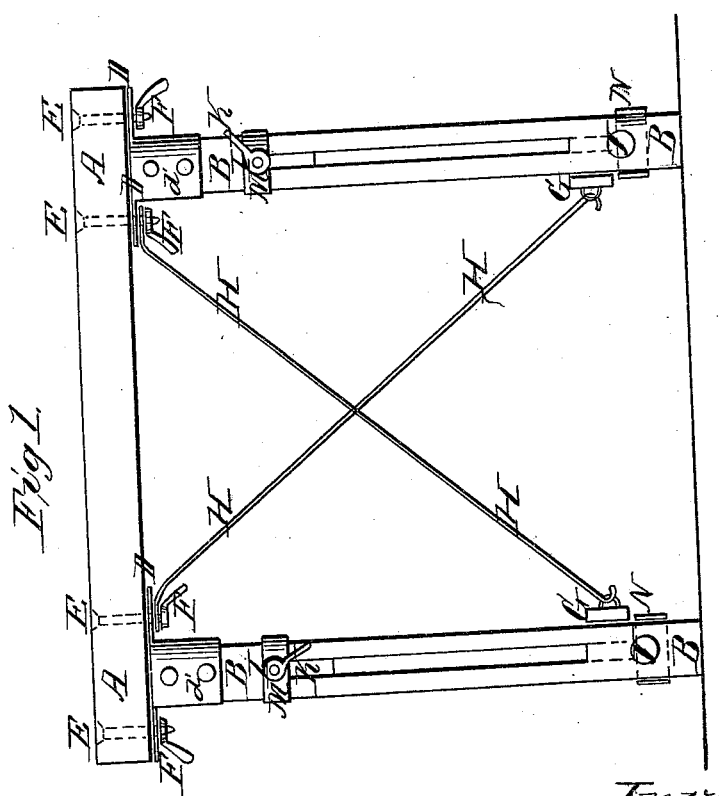
Witnesses
Inventor
Jas. E. Gedney
Per Munn & Co
Attorneys

UNITED STATES PATENT OFFICE.

JAMES E. GEDNEY, OF PETALUMA, CALIFORNIA.

IMPROVED TRESTLE.

Specification forming part of Letters Patent No. 77,273, dated April 28, 1868.

*To all whom it may concern:*

Be it known that I, JAMES E. GEDNEY, of Petaluma, in the county of Sonoma and State of California, have invented a new and Improved Extension-Trestle; and I do hereby declare that the following is a full, clear, and exact description thereof, which will enable others skilled in the art to make and use the same, reference being had to the accompanying drawings, forming part of this specification, in which—

Figure 1 is a side view of my improved extension-trestle. Fig. 2 is an end view of the same.

Similar letters of reference indicate like parts.

My invention has for its object to furnish an improved extension-trestle so constructed and arranged that it may be adjusted to any desired height, or so as to stand level upon an uneven or inclined surface; and it consists in the manner in which the legs are secured to the beam, and in the combination of the false or extension legs with the ordinary legs of the trestle.

A is the beam. B are the ordinary legs, and C are the false or extension legs. D are the plates by means of which the legs B are secured to the beam A. Upon the lower side of the plates D, at or near their side edges, are formed sockets or caps $d'$, into which the upper ends of the legs B enter, and are secured in place by screws, bolts, or rivets, as may be convenient. The plates D, with the legs B attached, are removably secured to the beam A by bolts E passing down through the beam and plate, and by the thumb-nuts F, so that they can be readily detached when desired for transportation or storage.

If desired, the legs B may be hinged to the beam A; and, in the case of low trestle, they may be attached to the beam in the ordinary manner.

The lower ends of the legs B, at each end of the trestle, are connected by cross-bars G; and the trestle is further stiffened by the brace-rods H, the upper ends of which are secured to the beam A by the bolts E and nuts F. The lower ends of the rods H are hooked into staples or eyebolts attached to the cross-bars G. The middle parts of the legs B and C are slotted, as shown in Fig. 1, and they are secured to each other by the bolts I and J and thumb-nuts K and L. The bolts I pass through the upper ends of the legs C, through the slots in the legs B, and through the plates M, and are secured in place, clamping the legs B and C together, by the thumb-nuts K. In the same manner the bolts J pass through the lower parts of the legs B, through the slots in the legs C, and through the plates N, where they are secured in place by the thumb-nuts L. The ends of the plates M and N are turned down, as shown in the drawings, so as to keep them in their proper relative positions while the trestle is being adjusted.

By this construction the trestles may be readily and quickly taken apart, put together, adjusted to stand at any desired height upon an even, uneven, or inclined surface.

What I claim as new, and desire to secure by Letters Patent, is—

1. The legs B, attached to the beam A by means of the plates D, bolts E, and thumb-nuts F, as herein shown and described, and for the purpose set forth.

2. The combination of the beam A, extension-legs C, legs B, removable plates D, having sockets $d'$ and flanges for the passage of the bolts E, the bolts I J, thumb-nuts K L, and plates M N, as herein described, for the purpose specified.

3. Securing the extension-legs C to the legs B by means of the bolts I and J, thumb-nuts K and L, and plates M and N, as herein shown and described, and for the purpose set forth.

JAMES E. GEDNEY.

Witnesses:
 H. H. ATWATER,
 I. G. WICKERSHAM.